(12) United States Patent
Tilton et al.

(10) Patent No.: US 8,099,636 B2
(45) Date of Patent: Jan. 17, 2012

(54) SYSTEM AND METHOD FOR PROTECTING MEMORY STACKS USING A DEBUG UNIT

(75) Inventors: Robert Eugene Tilton, Washington, IL (US); Steven C. Bray, Dunlap, IL (US); Mark Matthew Hoffman, Wilmington, DE (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 12/219,049

(22) Filed: Jul. 15, 2008

(65) Prior Publication Data

US 2010/0017660 A1    Jan. 21, 2010

(51) Int. Cl.
 *G06F 11/00* (2006.01)
(52) U.S. Cl. .......................... 714/53; 711/146
(58) Field of Classification Search ................ None
See application file for complete search history.

(56) References Cited

U.S. PATENT DOCUMENTS

| | | | |
|---|---|---|---|
| 5,625,785 A | 4/1997 | Miura et al. | |
| 5,644,709 A * | 7/1997 | Austin | 714/53 |
| 5,862,148 A | 1/1999 | Typaldos et al. | |
| 6,175,913 B1 | 1/2001 | Chesters et al. | |
| 6,185,673 B1 * | 2/2001 | Dewan | 712/228 |
| 6,553,513 B1 | 4/2003 | Swoboda et al. | |
| 6,578,094 B1 * | 6/2003 | Moudgill | 710/57 |
| 6,697,971 B1 * | 2/2004 | Dwyer | 714/54 |
| 6,895,508 B1 | 5/2005 | Swanberg et al. | |
| 6,941,473 B2 | 9/2005 | Etoh et al. | |
| 6,993,663 B1 * | 1/2006 | Paya et al. | 711/163 |
| 6,996,677 B2 | 2/2006 | Lee et al. | |
| 7,181,585 B2 | 2/2007 | Abrashkevich et al. | |
| 7,231,666 B2 * | 6/2007 | Haugh | 726/22 |
| 7,251,735 B2 * | 7/2007 | Howard | 713/189 |
| 7,380,245 B1 * | 5/2008 | Lovette | 718/100 |
| 7,631,249 B2 * | 12/2009 | Borde et al. | 714/799 |
| 2001/0013094 A1 * | 8/2001 | Etoh et al. | 712/227 |
| 2002/0087951 A1 * | 7/2002 | Bang | 717/124 |
| 2003/0014667 A1 * | 1/2003 | Kolichtchak | 713/201 |
| 2003/0018929 A1 * | 1/2003 | Bardsley et al. | 714/39 |
| 2004/0103252 A1 | 5/2004 | Lee et al. | |
| 2005/0144412 A1 * | 6/2005 | Swafford et al. | 711/170 |
| 2005/0183066 A1 | 8/2005 | Jabori | |
| 2005/0198464 A1 * | 9/2005 | Sokolov | 711/203 |
| 2006/0242375 A1 * | 10/2006 | Sharpe et al. | 711/165 |
| 2007/0101317 A1 | 5/2007 | Shoji et al. | |
| 2008/0052468 A1 * | 2/2008 | Speirs et al. | 711/132 |

* cited by examiner

*Primary Examiner* — Gabriel L Chu
(74) *Attorney, Agent, or Firm* — Finnegan, Henderson, Farabow, Garrett & Dunner LLP

(57) ABSTRACT

A method is disclosed for detecting a memory stack fault. The method may include reserving a memory stack for executing software instructions. The method may also include enabling a debug unit and as the software instructions are execute, utilizing the debug unit to monitor a memory space adjacent to the memory stack. The method may further include identifying a memory stack fault if a write operation to the memory space is attempted.

18 Claims, 3 Drawing Sheets

SYSTEM AND METHOD FOR PROTECTING MEMORY STACKS USING A DEBUG UNIT

TECHNICAL FIELD

This application relates to a system and method for protecting memory stacks, and more particularly, to a system and method for protecting memory stacks using a debug unit.

BACKGROUND

In computing architectures, stacks are regions of memory where data is added or removed in a Last-In-First-Out manner. In a processor, memory stacks are usually reserved (or allocated) for certain software application tasks. For example, in most processors, each thread of execution has a reserved region of memory. When a software application executes, it may add some of its state data to the top of the stack; when the application terminates, it may remove that data from the stack. Because the data is added and removed in a last-in-first-out manner, stack allocation is very simple and typically faster than other allocation methods, such as heap allocation.

However, when a memory stack is incorrectly written in, the data stored in the stack may be corrupted. For example, a memory space in one memory stack may be written by a task other than the one the memory stack is reserved for, or the memory stack may overflow into another. The data corruption will result in random non-deterministic behavior of the embedded system. Therefore, there is a need to detect an incorrect write to memory stack and protect the memory stack from further corruptions.

A traditional method for protecting software stacks is to use a memory management unit (MMU) on a microprocessor. The minimum stack size that can be possibly allocated by an MMU is 4096 bytes. However, certain computational systems, such as embedded systems, usually have limited memory sizes. For example, the typical software stack sizes are in the 1024 bytes to 2048 bytes range in an embedded system processor. As a result, using the MMU to allocate and protect the stacks would result in a minimum stack size of 4096 bytes and thus, would waste memory. Therefore, a new method to protect software stacks in an embedded system is needed.

A method and apparatus for protecting processing elements from buffer overflow is described in U.S. Patent Publication No. 2004/0103252 to Lee et al. ("the '252 publication"). The apparatus disclosed by the '252 publication includes a memory stack for storing a return address in a first location in a stack memory. The apparatus further includes a second location separate from the stack memory for storing an address of the first location, and a third location separate from the stack memory for storing the return address itself. Upon completion of the subroutine, the address stored in the second location may be compared to the first location in the stack memory and an interrupt signal is generated if locations are not the same. Further, according to the '252 publication, the return address stored in the third location may be compared to the return address stored in the first location in the stack memory and a second interrupt signal is generated if the addresses are not the same.

Although the method and apparatus described in the '252 publication may be effective for protecting memory stacks in an embedded system, it may nevertheless be problematic. For example, the method described in the '252 publication requires storing the return address twice in both the first location and the third location, and also storing the address of the first location in the second location. That is, the method requires more memory than the memory stack to be protected. Therefore, the method described in the '252 publication may waste a large amount of memory, which is usually a limited resource in an embedded system. Furthermore, although the method described in the '252 publication may detect stack overflow and generate an interruption signal accordingly, the detection only occurs after the incorrect write is made. Because the stack overflow may have already damaged critical data stored in another memory stack at the time it is detected, the method lacks reliability in protecting the memory stack. In addition, the method described in the '252 publication may not be capable of detecting memory stack faults other than the buffer overflow.

The disclosed system and method for protecting memory stacks are directed towards overcoming one or more of the shortcomings set forth above.

SUMMARY

In one aspect, a method is disclosed for detecting a memory stack fault. The method may include reserving a memory stack for executing software instructions. The method may also include enabling a debug unit and, as the software instructions are executed, utilizing the debug unit to monitor a memory space adjacent to the memory stack. The method may further include identifying a memory stack fault if a write operation to the memory space is attempted.

In another aspect, a memory stack protection apparatus is disclosed for detecting a memory stack fault. The memory stack protection apparatus may include a debug unit and a processing unit coupled to the debug unit. The processing unit may be configured to reserve a memory stack for executing software instructions and enable the debug unit. The debug unit may be configured to monitor a memory space adjacent to the memory stack, as the software instructions are executed, and identify a memory stack fault if a write operation to the memory space is attempted.

DETAILED DESCRIPTION

Figure 1:
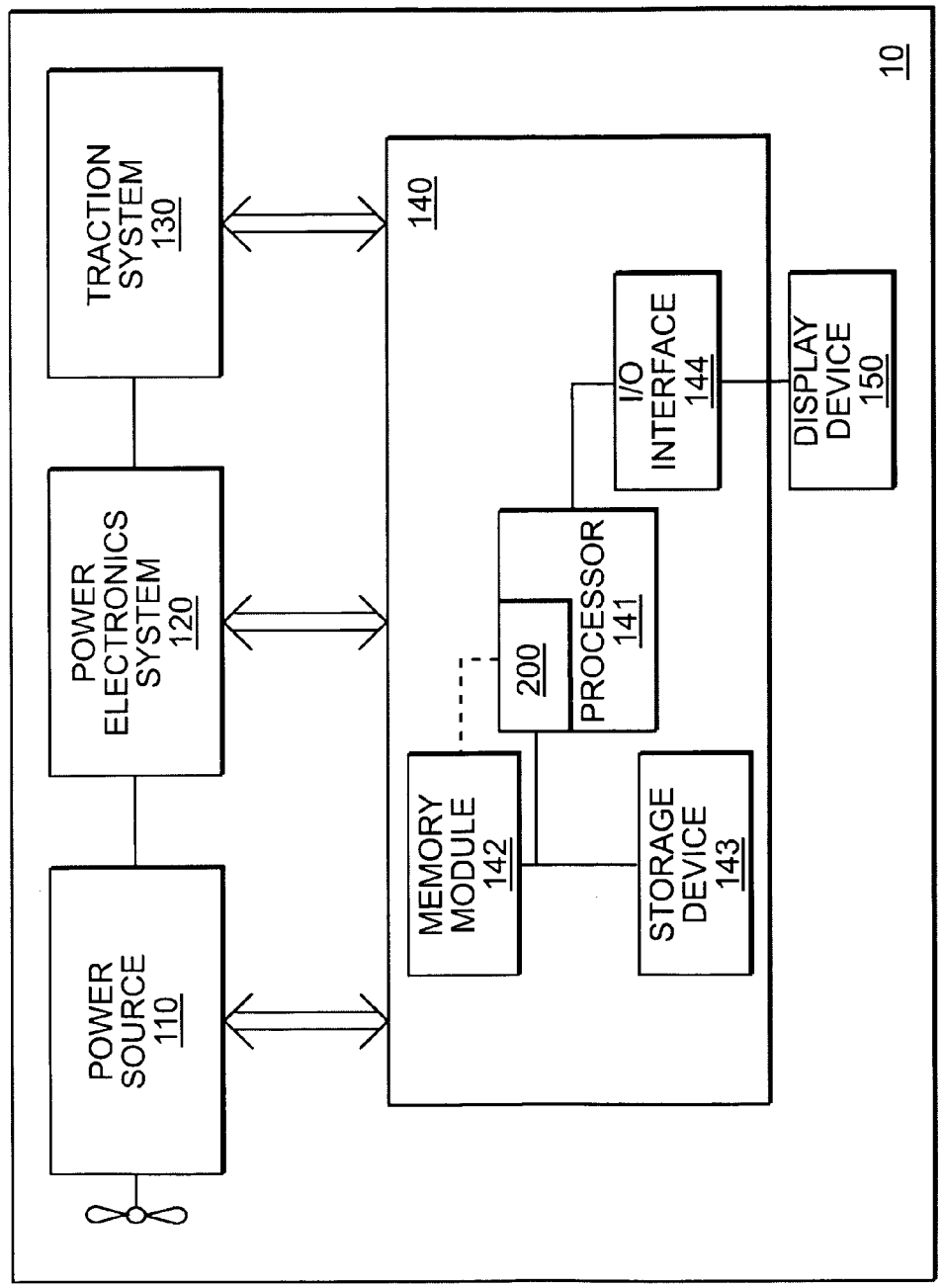
FIG. 1 provides a block diagram of a machine having an electronic control module, in accordance with an exemplary embodiment of the present disclosure.

FIG. 1 provides a block diagram of a machine 10, in accordance with an exemplary embodiment of the present disclosure. Machine 10 may include, among other things, a power source 110, a power electronics system 120, a traction system 130, an electronic control module (ECM) 140, and a display device 150. Machine 10, as the term is used herein, refers to a fixed or mobile machine that may perform some type of operation associated with a particular industry, such as mining, construction, farming, etc.

Power source 110 may include various components configured to provide electric power for use by one or more systems of machine 10. For example, power source 110 may include an engine and a generator. Power electronics system 120 may be electrically coupled to power source 110 via a first set of conductors, and to traction system 130 via a second set of conductors. Power electronics system 120 may be configured to convert power provided by power source 110 into power forms appropriate for consumption by traction system 130. Traction system 130 may provide mechanical power to move machine 10.

Machine 10 may include an ECM 140 to control the operation of power source 110, power electronics system 120, and traction system 130. ECM 140 may include any appropriate type of electronic control system configured to perform engine control functions such that the engine of machine 10 may operate properly. Multiple ECMs may be included in ECM 140 or may be used on machine 10. For example, a plurality of ECMs may be used to control different systems of machine 10 and also to coordinate operations of these systems. Further, the plurality of ECMs may be coupled together via a communication network to exchange information. Information such as input parameters, output parameters, parameter values, and status of control systems may be communicated to the plurality of ECMs simultaneously.

ECM 140 may include any number of devices, such as microprocessors or microcontrollers, memory modules, communication devices, input/output devices, and storage devices, to perform such control functions. Consistent with the embodiment shown in FIG. 1, ECM 140 may include, among other things, a processor 141, a memory module 142, a storage device 143, an I/O interface 144, and a memory stack protection device 200. These devices may be configured to transfer data and send or receive instructions between or among each other.

Processor 141 may include any appropriate type of general purpose microprocessor, digital signal processor, or microcontroller. For example, processor 141 may be a Freescale MPC 5500 series microprocessor. Memory module 142 may include one or more memory devices including, but not limited to, a ROM, a flash memory, a dynamic RAM, and a static RAM. Processor 141 and memory module 142 may be coupled to each other via a bus to transmit data. Computer software instructions may be stored in or loaded to memory module 142, and executed by processor 141. Processor 141 may execute the computer software instructions to perform various control functions and processes. For example, computer instructions may be executed to control the switching of power electronic devices in power electronics system 120. Consistent with embodiments of the present disclosure, processor 141 may execute one software application at a time to perform a single control function. Alternatively, processor 141 may execute multiple software applications simultaneously.

In executing a certain software application, processor 141 may use a single thread or multiple threads. Each thread may have a reserved memory stack in memory module 142. When the software instructions execute with a certain thread, some state data related to the software instructions, such as program counters, may be stored in the corresponding stack. For example, instructions are usually stored and executed in a sequential order. That is, upon the execution of an instruction, processor 141 may move to the memory space adjacent to the memory space storing the current instruction, and execute the instruction stored therein. However, in some cases, the current instruction, upon execution, may instruct processor 141 to skip a few instructions and execute a subroutine stored in another location of the memory. In such cases, the address of the current instruction may be temporarily stored in the memory stack so that it may be later recovered to enable processor 141 to return to the instruction, after the subroutine is completed. These state data, such as the return addresses, may be removed from the stack and the memory space occupied by the memory stack may be released, once the software execution is completed.

Memory stacks may be allocated by processor 141 before a computer application is executed. Each memory stack may be allocated as a continuous region of memory in the memory module of processor 141. There may be some memory space left not addressed between two memory stacks. Each memory stack, upon allocation, may occupy a determined size of memory. For example, in an embedded system such as ECM 140 shown in FIG. 1, the size of the allocated memory stack may be relatively smaller than ones on a personal computer. Consistent with one embodiment, the memory stack may be less than 4096 bytes in size, such as 1024 bytes or 2048 bytes.

Consistent with one embodiment, state data may be stored in the memory stack in a last-in-first-out manner. When new data is added to the top of the memory stack, the existing data in the memory stack may each move one step down towards the bottom of the memory stack, such that a memory space at the top of the memory stack is released to store the new data. Therefore, writing more data than the allocated size of a memory stack can result in an incorrect write operation into a second memory stack, known as a memory stack overflow. Besides overflow, other types of incorrect write operations may also occur to memory stacks that are not reserved for executing the current software application. Incorrect write operations to the second memory stack may damage data stored therein and may result in memory corruption or crash. As an example, if program counters stored in the memory stack are corrupted, the program may not be able to return to the right address in the main routine, once a subroutine is completed. As another example, if critical operating system data stored in the memory stack is damaged or overwritten, operating system of ECM 140 may crash.

In order to avoid incorrect write to memory stacks, a memory stack protection device 200 may be included and coupled to memory module 142. Consistent with one embodiment, memory stack protection device 200 may be included as an integrated part of processor 141. Alternatively, memory stack protection device 200 may be external to processor 141, for example, as part of a separate processing system associated with ECM 140.

Memory stack protection device 200 may be configured to detect a memory stack fault in memory module 142 which is reserved for executing a software application. Memory stack protection device 200 may include a debug unit coupled to the memory stack and a processing unit coupled to the debug unit and the memory stack. The processing unit may be configured to enable the debug unit. The debug unit may be configured to continuously monitor a memory space adjacent to the memory stack, when the software application is executed. If, during the execution, a write operation to the memory space is detected, the debug unit may identify a memory stack fault. The write operation may be made by processing unit 210 and may be captured as an attempt before it is actually made to memory module 142. For example, the write operation may be captured on the bus between processing unit 210 and memory module 142.

Consistent with one embodiment, the debug unit may be further configured to monitor a range of memory in the second memory stack which is not reserved for executing the current software application. The debug unit may identify the memory stack fault if a write operation to at least one byte in the range of memory is detected. Consistent with one embodiment, the debug unit may be further configured to generate an interrupt if the memory stack fault is identified, and send the interrupt to the processing unit. Memory stack protection device 200 will be described in greater detail in the present disclosure, in connection with FIG. 2.

ECM 140 may further include a storage device 143. Storage device 143 may include any appropriate type of mass storage provided to store any type of information that processor 141 may need to operate. For example, storage device 143 may include one or more hard disk devices, optical disk devices, or other storage devices to provide storage space. Storage device 143 may be configured to store computer software that is executable by processor 141. Consistent with one embodiment, storage device 143 may also be configured to store log data related to an incorrect write to a memory stack.

Further, I/O interface 144 may be configured to obtain data from various external devices and/or to transmit data to ECM 140. I/O interface 144 may also be configured to transmit data from ECM 140 to various external devices. For example, a display device 150 may be coupled to ECM 140 via I/O interface 144. Display device 150 may be, for example, a computer, an operator panel, or an LCD. Display device 150 may be configured to receive and display a warning signal when an incorrect write to a memory stack is identified with ECM 140 of machine 10. Display device 150 may further include an audio unit and provide an audible indication when the incorrect write to the memory stack is identified.

Figure 2:
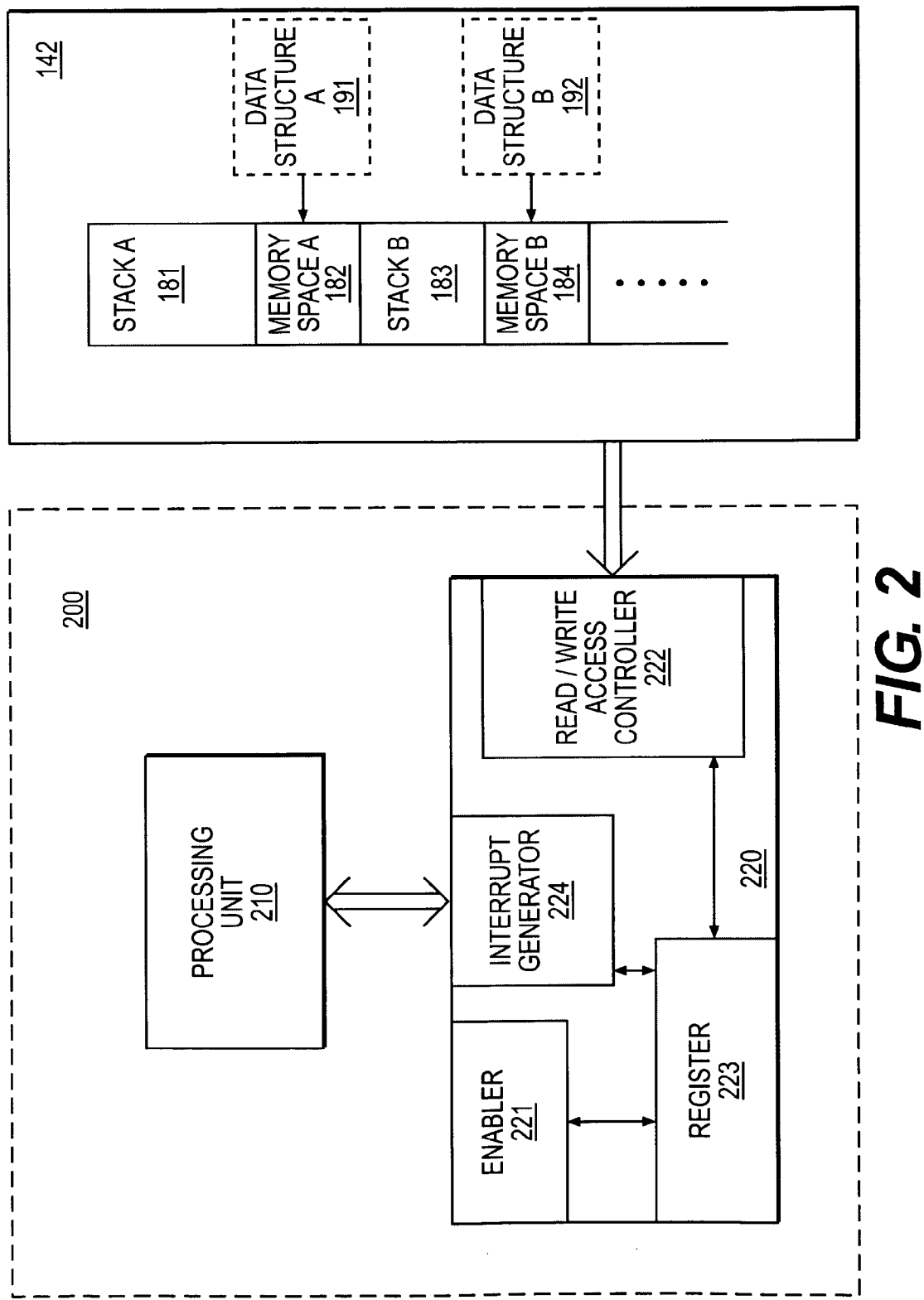
FIG. 2 provides a block diagram of a memory stack protection device associated with an electronic control module, in accordance with an exemplary embodiment of the present disclosure.

FIG. 2 provides a block diagram of memory stack protection device 200 associated with ECM 140, in accordance with an exemplary embodiment of the present disclosure. Memory stack protection device 200 may be coupled to memory module 142 and configured to protect memory module 142 from an incorrect write. A plurality of memory stacks, such as stack A 181 and stack B 183, may be allocated upon the execution of software instructions. As an example, stack A 181 may be allocated for one software application and stack B 183 may be allocated for another. As another example, stack A 181 and stack B 183 may be allocated for two different threads of execution of the same software application.

Between every two memory stacks in memory module 142, there may be a range of memory, such as memory space A 182 or memory space B 184, that includes one or more unaddressed bytes. For example, memory space A 182 may be left unaddressed between stack A 181 and stack B 183. Similarly, memory space B 184 may be left unaddressed between stack B 183 and a memory stack thereafter. Since these unaddressed memory spaces are not reserved for any memory stacks, they should normally not be written during the execution of software instructions. A write operation to any byte in such a memory space might only occur when the memory stack overflows. Therefore, a write operation to an unaddressed memory space may indicate a memory stack fault associated with memory module 142. In addition, if stack B 183 is not reserved for executing the software application, it should normally not be written during the execution of the software application either. Therefore, a write operation to any memory space in stack B 183 may also indicate a memory stack fault associated with memory module 142. Consistent with the present disclosure, memory stack protection device 200 may be configured to detect these memory stack faults.

As illustrated in FIG. 2, memory stack protection device 200 may include, among other things, a processing unit 210 and a debug unit 220. Processing unit 210 may be connected to debug unit 220 for data and instruction communication, and both processing unit 210 and debug unit 220 may be coupled to memory module 142, for example, via a data bus. Processing unit 210 may include any appropriate type of logic machines that can execute computer programs, such as the CPU on a general purpose microprocessor. In one embodiment, processing unit 210 may be an auxiliary processing unit for high-performance digital signal processing and floating point functionality, on a MPC500 series microprocessor. Debug unit 220 may be an on-chip component of a microprocessor and may be configured to debug the microprocessor during the design and testing stage. In one embodiment, debug unit 220 may be the JTAG debug unit or Nexus 3 IEEE-ISTO debug unit on the MPC5500 microprocessor.

Processing unit 210 may be configured to enable debug unit 220. Consistent with one embodiment, processing unit 210 may generate and send out an enabling signal during the initialization stage of executing the software application. Debug unit 220 may include, among other things, an enabler 221, a read/write access controller 222, a register 223, and an interrupt generator 224. Debug unit 220 may be disabled and idle unless it is enabled by the enabling signal from processing unit 210. Enabler 221 may include an interface configured to receive the enabling signal and enable debug unit 220.

Once debug unit 220 is enabled, it may monitor the memory space adjacent to the memory stack that is reserved for executing the current software application. For example, debug unit 220 may monitor memory space A 182, adjacent to stack A 181, via read/write access controller 222. In one embodiment, read/write access controller 222 may monitor the bus coupling processing unit 210 and memory module 142, and detect write operations to any byte in memory space A 182. As a result, the write operation may be captured as an attempt before it is actually made to memory module 142. A write operation to memory space A 182 may indicate a memory stack fault associated with memory module 142. Interrupt generator 224 may be notified, if a write operation to memory space A 182 is detected.

Consistent with another embodiment, debug unit may also monitor one or more memory stacks that are not reserved for executing the current software application. For example, debut unit 220 may monitor stack B 183 via read/write access controller 222. In one embodiment, read/write access controller 222 may monitor the range of memory in stack B 183, and detect write operations of any byte in the range of memory. In one embodiment, the range of memory may include the entire stack B 183. In another embodiment, the range of memory being monitored may be determined by processing unit 210, based on the content stored in the range of memory. For example, processing unit 210 may determine to monitor a range of memory that contains critical operation system data. A write operation to any byte in the range of memory may indicate a memory stack fault associated with memory module 142. Interrupt generator 224 may be notified if a write operation to any byte in the range is detected.

Interrupt generator 224 may be coupled to processing unit 210, and may be configured to generate an interrupt and send the interrupt to processing unit 210. The interrupt may include the starting address of a subroutine and sending the interrupt to processing unit 210 and may trigger the execution of the subroutine. When the interrupt is detected by processing unit 210, processing unit 210 may jump to execute the subroutine stored at the address included in the interrupt. The function of the interrupt may be defined in advance. Consistent with one embodiment, the subroutine, when executed by processing unit 210, may perform actions to protect memory module 142. As an example, the subroutine may terminate the execution of the software application or shut down ECM 140 to prevent incorrect write to memory module 142.

Consistent with one embodiment, content stored in memory space A 182 or stack 183 may be monitored, and the memory stack fault may be identified if the content changes.

For example, processing unit 210 may be configured to write a data structure 191 to memory space A 182 during the initialization stage of executing a computer software application, where stack A 181 is allocated by processor 141 for storing state data related to the software application. Data structure 191 may be an integer, a floating point number, a letter or data of any other type. Consistent with one embodiment, data structure 191 may be determined by processing unit 210, according to the computer software application that is being executed. Once debug unit 220 is enabled, it may monitor the current value of data structure 191 in memory space A 182 via read/write access controller 222. In one embodiment, read/write access controller 222 may communicate with memory module 142 to read the current value of data structure 191.

Read/write access controller 222 may first obtain an initial value of data structure 191, before the software application is executed, for example, during the initialization stage. Read/write access controller 222 may then continuously monitor the current value of data structure 191, after each computer instruction in the application is executed. Read/write access controller 222 may be further configured to send the obtained initial value and current values to register 223. Register 223 may include a plurality of data registers that are small amounts of memory in debug unit 220. These data registers may be configured to hold data structures such as integer or floating point values. For example, the initial value of data structure 191 may be held in a first data register, and the current value of data structure 191 may be held in a second data register. The second data register may be constantly updated with the new current value obtained by read/write access controller 222, after each computer instruction is executed.

Debug unit 220 may be configured to compare the values held in the first data register (the initial value of data structure 191) and in the second data register (the current value of data structure 192) of register 223. Debug unit 220 may determine if the initial value matches with the current value, i.e., if the value of data structure 191 is changed. Changing of the value of data structure 191 may indicate an incorrect write to stack A 181. Interrupt generator 224 may be notified, if the two values held in the two data registers do not match.

Interrupt generator 224 may be configured to generate an interrupt to trigger a protection function performed by a subroutine. As an example, the subroutine may terminate the execution of the software application to prevent further incorrect write to memory module 142. As another example, if the memory stack fault is identified as a result of stack overflow, the subroutine may undo the last write operation to stack A 181 and recover the data stored in stack A 181.

INDUSTRIAL APPLICABILITY

Although the disclosed embodiments are described in association with a protection system for protecting memory stacks, the disclosed protection system may also be used to protect other storing elements in a memory module, such as internal data elements. In addition, although the memory stack protection system is disclosed for an embedded system, such as a machine ECM, the protection system may be used in any computer or controller related environment, where it may be desirable to protect memory stacks that are too small to be handled by an MMU. Specifically, the disclosed protection system may be configured to detect a storing element fault in a memory module during execution of software instructions. The disclosed protection system may monitor a memory space adjacent to the memory stack, when the software instructions is executed, and identify a memory stack fault if a write operation to the memory space is attempted. The disclosed protection system may further generate an interrupt if a fault is identified; and send the interrupt to a processor executing the computer instructions.

Figure 3:
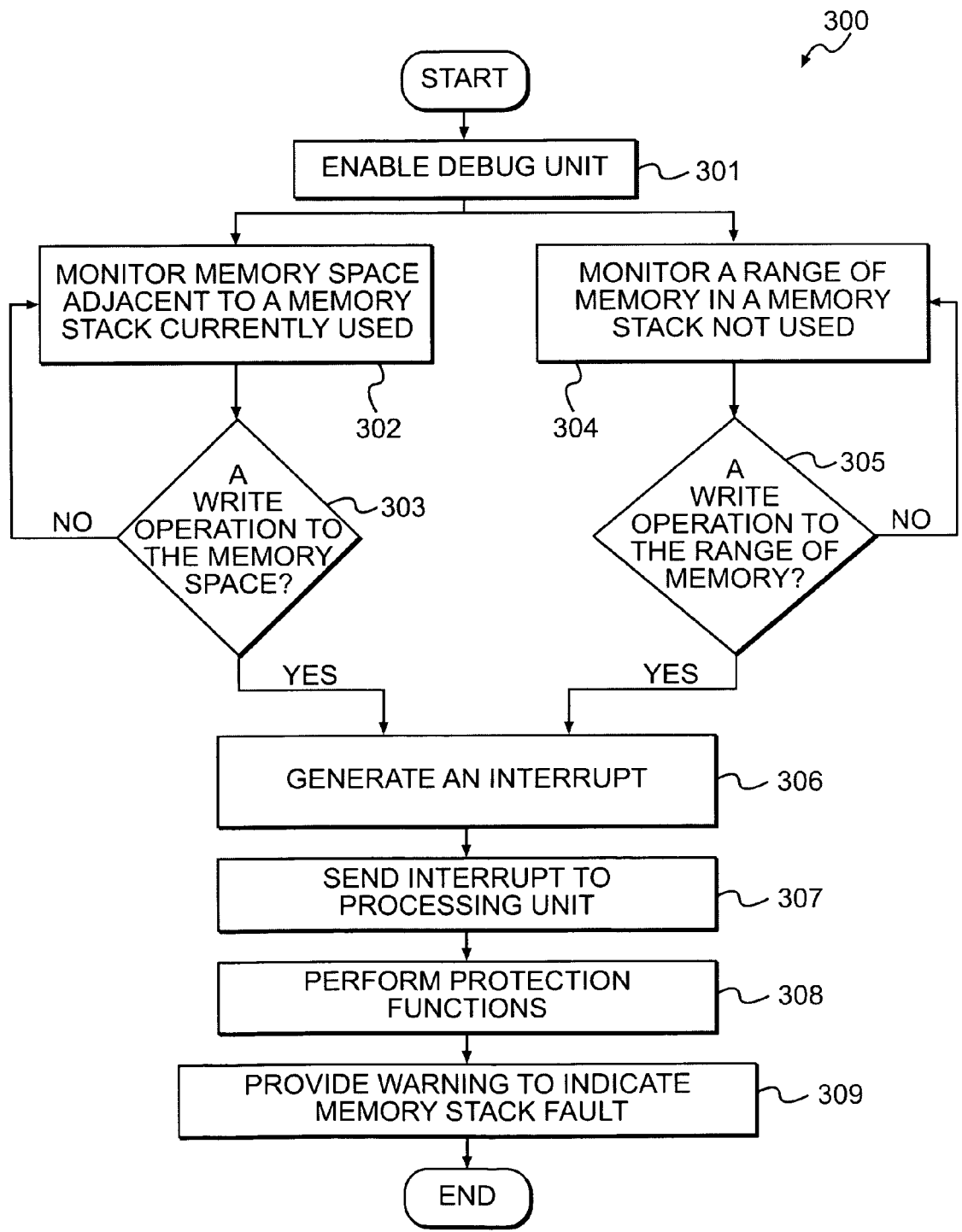
FIG. 3 provides a flowchart of an exemplary process for protecting a memory stack.

FIG. 3 provides a flowchart of an exemplary process 300 of memory stack protection device 200 for protecting a memory stack. In the embodiment consistent with process 300, memory stack protection device 200 may be configured to protect stack A 181 and stack B 183 in memory module 142. Stack A 181 may be reserved for one software application thread being executed, while stack B 183 may not be reserved for the execution. However, it is contemplated that when multiple threads are executed, memory stack protection device 200 may be configured to simultaneously protect any memory stacks associated with the threads. For example, stack A 181 and stack B 183 may be allocated for the two threads of execution respectively. Memory stack protection device 200 may be configured to simultaneously monitor and protect both memory stacks in a parallel manner.

Process 300 may start when debug unit 220 is enabled by an enabling signal sent from processing unit 210 (Step 301). Consistent with one embodiment, processing unit 210 may generate and send out the enabling signal to enabler 221 of debug unit 220. Enabler 221 may be configured to determine whether the enabling signal is within the range that may enable debug unit 220. For example, the enabling signal may be a "high" voltage signal corresponding to a logic "1" for debug unit 220.

After debug unit 220 is enabled, read/write access controller 222 of debug unit 220 may be configured to monitor memory space A 182 that is adjacent to stack A 181 (Step 302). Memory space A 182 may include one or more bytes. Read/write access controller 222 may continuously monitor all the bytes of memory space A 182 during execution of the software application. Consistent with one embodiment, read/write access controller 222 may monitor the bus coupling processing unit 210 and memory module 142. By monitoring memory space A 182, debug unit 220 may detect write operations attempted to the memory space (Step 303).

If no write operation is attempted to any byte of memory space A 182 (Step 303: No), process 300 may return to Step 302 to continue monitoring memory space A 182. If a write operation is attempted to at least one byte of memory space A 182 (Step 303: Yes), a memory stack fault may be identified and an interrupt may be generated to indicate the fault (Step 306). For example, interrupt generator 224 may be notified by debug unit 220 if a write operation to memory space A 182 is attempted.

Read/write access controller 222 of debug unit 220 may also be configured to monitor a range of memory in stack B 183 (Step 304). The range of memory may include one or more bytes. In one embodiment, the range of memory may be a portion of stack B 183, which, for example, may be specified by processing unit 210. In another embodiment, the range of memory may contain the entire stack B 183. Read/write access controller 222 may continuously monitor all the bytes in the range of memory during execution of the software application. Debug unit 220 may detect if any write operation is attempted to the range of memory (Step 305). In one embodiment, debug unit 220 may further determine if the write operation is authorized. While authorization to access memory stacks that are not reserved for the current software execution may be rare, it may some times occur and such authorized write operation attempts should not be detected as memory stack fault.

If no write operation is attempted to any byte of memory space A 182 (Step 305: No), process 300 may return to Step 304 to continue monitoring memory space A 182. If an unauthorized write operation attempt is detected to at least one byte in the range of memory (Step 305: Yes), a memory stack fault may be identified and interrupt generator 224 may be notified by debug unit 220.

An interrupt may be generated to indicate the fault (Step 306). Interrupt generator 224 may be configured to send the generated interrupt to processing unit 210 (Step 307). The interrupt may include the starting address of a subroutine, and processing unit 210 may execute the subroutine to perform actions to protect stack A 181 and stack B 183 (Step 308). Consistent with one embodiment, the interrupt may terminate the execution of the software application to prevent further incorrect write operation to stack A 181 and stack B 183. The interrupt may further shut down ECM 140 or machine 10 to protect machine malfunctions. When the interrupt generated by interrupt generator 224 is detected by processing unit 210, processing unit 210 may jump to execute the subroutine stored at the address included in the interrupt.

Processing unit 210 may be further configured to send a warning signal to display device 150, via I/O interface 144, to indicate the memory stack fault to a user (Step 309). Consistent with one embodiment, the warning may also be part of the interrupt. Display device 150 may provide a visible (such as flashing of an LED) and/or audible warning (such as an alarm via a speaker) signal. A detailed description of the memory stack fault may also be displayed on a display panel of display device 150. For example, the description may contain the name of the software application being executed, current status of the execution (e.g., completed, paused or terminated), the time that the incorrect write occurs, and the location of the incorrect write.

Memory stack protection device 200 in the present disclosure may provide increased reliability for protecting memory stacks in an embedded system. First, memory stack protection device 200 may be used to protect memory stacks of sizes smaller than 4096 k bytes, while MMU may be typically applied when the stack size is over 4096 bytes. Therefore, memory stack protection device 200 may be particularly useful in embedded systems that have limited amount of memory and smaller size stacks. Moreover, according to embodiments of the present disclosure, the detection of the memory stack fault may occur before the incorrect write is made to the memory stacks. That is, an attempt of incorrect write may be detected before any critical data stored in the memory stacks is damaged. Furthermore, memory stack protection device 200 uses an on-chip debug unit 220 to detect incorrect write attempts to memory stacks. Thus, no additional data storage is needed in memory module 142 and no external devices may be required for detecting the memory stack fault.

In addition, memory stack protection device 200 disclosed in the present disclosure may be capable of detecting any type of memory stack faults, including, for example, memory overflow, corruption, etc. For example, memory stack protection device 200 may detect memory overflow associated with a memory stack currently used by a software execution, by monitoring the unaddressed memory space adjacent to the memory stack. Memory stack protection device 200 may also detect memory corruption associated with a memory stack that is not used by the software execution, by monitoring a range of memory in the memory stack.

It will be apparent to those skilled in the art that various modifications and variations can be made to the disclosed memory stack protection device 200 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for detecting a memory stack fault, the method comprising:
   reserving a first memory stack for executing software instructions;
   by a processor, performing write operations to the first memory stack;
   enabling a debug unit integrated on the processor;
   as the software instructions are executed, utilizing the debug unit to monitor a memory space adjacent to the first memory stack;
   detecting, using the debug unit, whether a write operation to the memory space adjacent to the first memory stack is attempted;
   when an attempted write operation to the memory space adjacent to the first memory stack is detected:
      identifying a memory stack fault; and
      interrupting the attempted write operation;
   utilizing the debug unit to monitor a range of memory in a second memory stack, wherein the second memory stack is not used for executing software instructions;
   detecting, using the debug unit, whether a write operation in the range of memory in the second memory stack is attempted; and
   when an attempted write operation to the range of memory in the second memory stack is detected:
      identifying a memory stack fault; and
      interrupting the attempted write operation to the range of memory in the second memory stack.

2. The method of claim 1, further including providing a warning if the memory stack fault is identified.

3. The method of claim 1, wherein the first memory stack has a size of less than 4096 bytes.

4. The method of claim 1, wherein identifying the memory stack fault further includes:
   generating an interrupt using the debug unit, if the memory stack fault is identified; and
   sending the interrupt to a processing unit executing the software instructions.

5. The method of claim 4, wherein the interrupt triggers a mode of operation to protect the first memory stack.

6. The method of claim 1, wherein interrupting the attempted write operation includes capturing, by the debug unit, the write operation on a bus connecting the processor to a memory module storing the first memory stack.

7. A memory stack protection apparatus for detecting a memory stack fault, the memory stack protection apparatus comprising a debug unit and a processing unit coupled to the debug unit,
   wherein the processing unit is configured to:
      reserve a first memory stack for executing software instructions;
      reserve a second memory stack; and
      enable the debug unit;
   wherein the debug unit is configured to:
      monitor a range of memory space in the second memory stack, as the software instructions are executed;
      detect whether a write operation to the range of memory space in the second memory stack is attempted; and when an attempted write operation to the range of memory space in the second memory stack is detected:
identify a memory stack fault; and
interrupt the attempted write operation before the write operation is made.

8. The memory stack protection apparatus of claim 7, wherein the memory stack protection apparatus is coupled with a display device, and the display device is configured to provide an indication if the memory stack fault is identified.

9. The memory stack protection apparatus of claim 7, wherein the first memory stack has a size of less than 4096 bytes.

10. The memory stack protection apparatus of claim 7, wherein the debug unit is further configured to:
generate an interrupt if the memory stack fault is identified; and
send the interrupt to the processing unit.

11. The memory stack protection apparatus of claim 7, further comprising a processor configured to perform write operations on the first and second memory stacks, the first and second memory stacks being stored in a memory module,
wherein the debug unit is configured to interrupt the attempted write operation by capturing the attempted write operation on a bus connecting the processor to the memory module.

12. An electronic controller for a machine, comprising:
a memory module comprising one or more memory stacks; and
a memory stack protection apparatus coupled to a memory stack for detecting a memory stack fault associated with the memory stack, wherein the memory stack is reserved for executing software instructions,
the memory stack protection apparatus including a debug unit coupled to the memory stack and a processing unit coupled to the debug unit,
wherein the processing unit is configured to enable the debug unit; and
wherein the debug unit is configured to:
monitor a memory space adjacent to the memory stack, as the software instructions are executed;
detect whether a write operation to the adjacent memory space is attempted; and
when an attempted write operation to the adjacent memory space is detected, determine whether the attempted write operation to the memory space is authorized or unauthorized;
when it is determined that the attempted write operation to the memory space is unauthorized, identify a memory stack fault and interrupt the write operation before the write operation is made; and
when it is determined that the attempted write operation to the memory space is authorized, permit the write operation.

13. The electronic controller of claim 12, wherein the memory stack has a size of less than 4096 bytes.

14. The electronic controller of claim 12, wherein the debug unit is further coupled to a second memory stack in the memory module, wherein the second memory stack is not used for executing the software instructions, and wherein the debug unit is further configured to:
monitor a range of memory in the second memory stack;
detect whether a write operation to at least one byte in the range of memory is attempted; and
when an attempted write operation to in the range of memory is detected:
identify the memory stack fault; and
interrupt the write operation to the range of memory.

15. The electronic controller of claim 12, wherein the debug unit is further configured to:
generate an interrupt if the memory stack fault is identified; and
send the interrupt to the processing unit.

16. The electronic controller of claim 12, further comprising a processor configured to perform write operations on the memory stack, wherein the debug unit is configured to interrupt the attempted write operation by capturing the attempted write operation on a bus connecting the processor to the memory module.

17. An apparatus for detecting a memory stack fault, the apparatus comprising:
a processor configured to read and write to a first memory stack in a memory module, the first memory stack being used for executing software instructions;
a debug unit being configured to:
monitor a memory space in a second memory stack, the second memory space not being used for executing software instructions;
detect whether the processor attempts to perform a write operation to the memory space in the second memory stack; and
when an attempted write operation to the memory space in the second memory stack is detected, determine a memory stack fault and interrupt the attempted write operation.

18. The apparatus of claim 17, wherein the debug unit is configured to interrupt the attempted write operation by capturing the attempted write operation on a bus connecting the processor to the memory module.

\* \* \* \* \*